United States Patent [19]

Fleck

[11] 4,442,382
[45] Apr. 10, 1984

[54] CONSTANT POWER SWITCHING POWER SUPPLY

[75] Inventor: William C. Fleck, Palisades Park, N.J.

[73] Assignee: Chiu Technical Corporation, Kings Park, N.Y.

[21] Appl. No.: 395,136

[22] Filed: Jul. 6, 1982

[51] Int. Cl.³ .......................... G05F 1/00; H05B 41/16
[52] U.S. Cl. ...................................... 315/287; 315/307
[58] Field of Search .......................... 315/287, 307, 308

[56] References Cited

U.S. PATENT DOCUMENTS

| 3,473,084 | 10/1969 | Dodge | 315/158 |
| 4,037,148 | 7/1977 | Owens et al. | 315/194 |
| 4,051,412 | 9/1977 | Knoble | 315/287 |
| 4,156,166 | 5/1979 | Shapiro | 315/307 |

Primary Examiner—Harold Dixon
Attorney, Agent, or Firm—Leonard Belkin

[57] ABSTRACT

A power supply for a gaseous discharge lamp in which power adjustments are made automatically to insure that rated lamp power is delivered regardless of changes in lamp impedance or line voltage which may occur. A high D.C. voltage is delivered to a step down low hysteresis transformer and electronic switching is provided to obtain a high frequency pulsed flow to the primary of the transformer. Sawtooth waves are generated and peak current is utilized to regulate closely power input to the transformer. A feature is the use of a programming resistor to select the desired power level for the particular gas discharge lamp.

10 Claims, 5 Drawing Figures

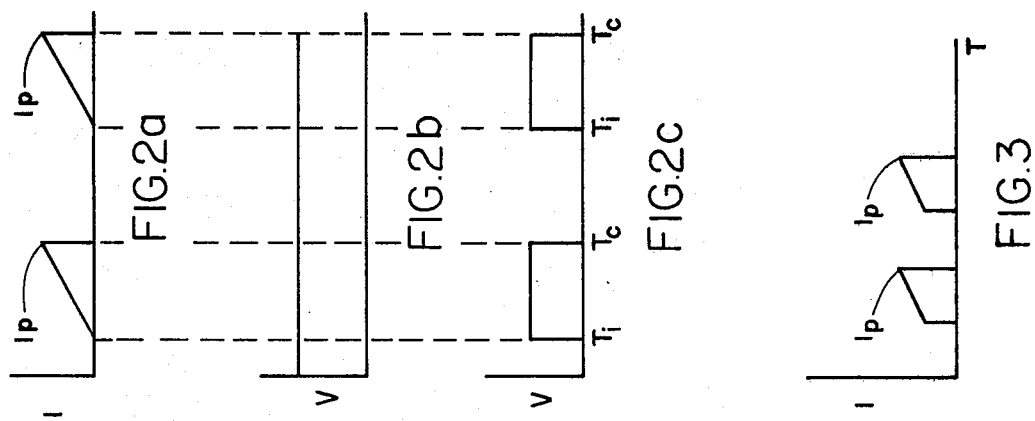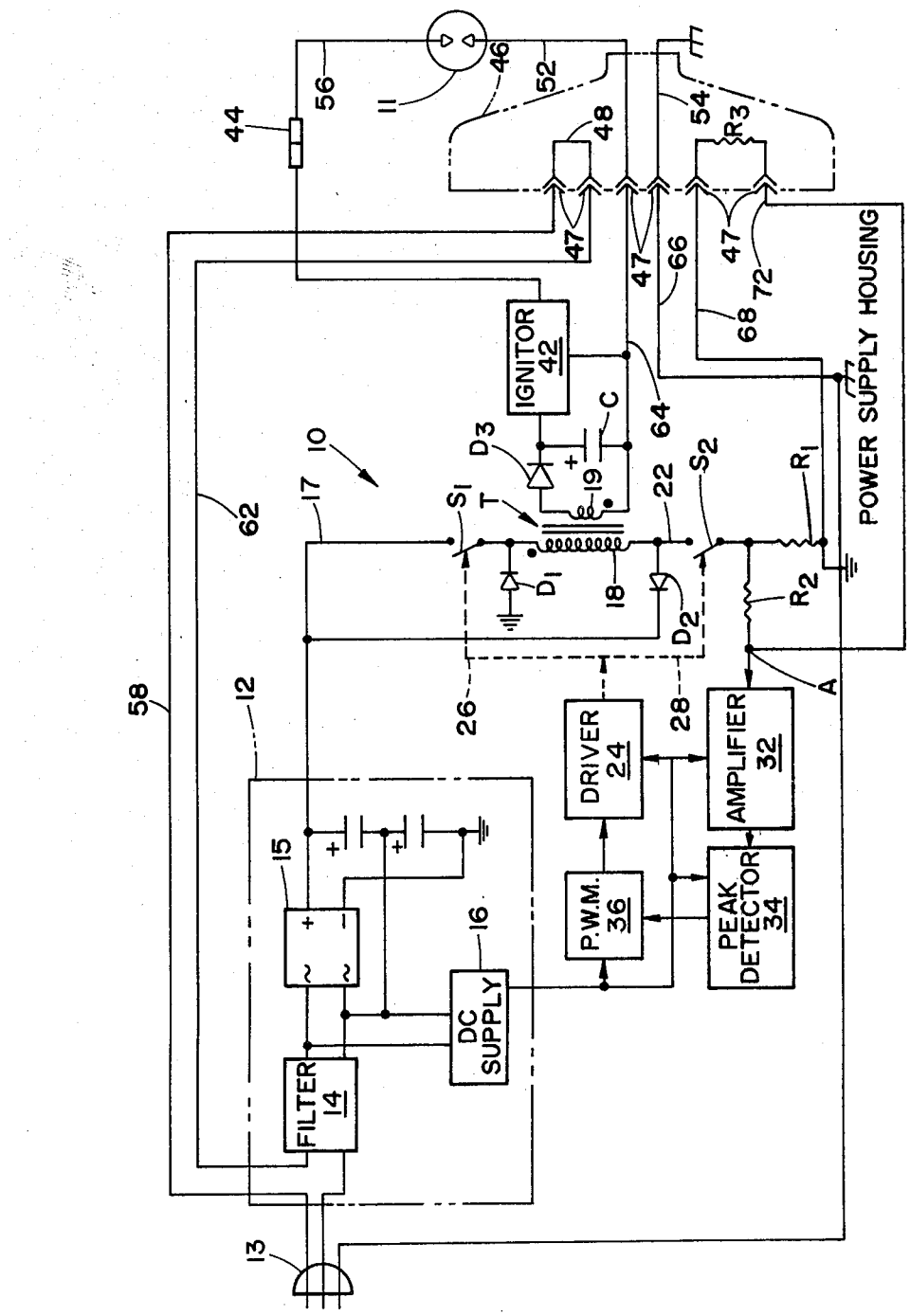

CONSTANT POWER SWITCHING POWER SUPPLY

BACKGROUND OF THE INVENTION

This invention relates to a constant power output electric power supply and more particularly to a DC power supply whose output is maintained constant in the face of changing load and line voltage conditions.

In certain applications, notably arc lamps in medical applications, it is highly desirable to deliver a constant rate of DC power. Each lamp has a power rating provided by the manufacturer. If energy delivered to the lamp exceeds its rating, the life of the lamp will be shortened. If the power delivered falls below the lamp's rating, the gas within the lamp will drop below its proper operating temperature, and this will tend to coat the inside of the envelope with a residue thereby reducing the light output, also effectively reducing the life of the lamp. As these lamps are quite expensive, it is highly desirable to maintain power levels within a fairly narrow range.

Maintaining flow of power to such a lamp is made more difficult by the fact that there is a tendency of the impedance of a gaseous discharge lamp to vary. This can occur in lamp to lamp because of manufacturing variables, it may vary because of the type of use, i.e., continuous versus intermittent use, and the impedance can change over a longer period of time due to aging.

Another problem has to do with switching from one kind of a lamp to another. Some lamps, typically xenon, may require 150 watts of power, whereas other lamps, such as mercury, may require 200 watts. In the event the operator fails to adjust the supply accordingly when the type of lamp is switched, lamp life can be shortened drastically.

Power supplies currently available for delivering a constant DC power under the conditions described above are heavy, weighing typically 40 to 50 pounds and are quite inefficient. Such devices generate substantial amounts of heat and usually require some provision for cooling, usually fans, adding to their inefficiency.

In U.S. Pat. No. 3,486,071 to Hedge, a more efficient arrangement is illustrated for delivering power to a xenon lamp operating to supply flashes of light, an electronic stroboscope. In this patent, a circuit is provided to deliver pulses of energy which are of equal power, the purpose being to compensate for changes in the voltage being supplied.

In U.S. Pat. No. 3,611,021, current to fluorescent lamps is regulated by adjusting the frequency of an inverter. In U.S. Pat. No. 4,170,747, lamp intensity is varied by altering the "on" time of a voltage source which is pulsed. Other U.S. patents showing control circuits for gas discharge lamps include U.S. Pat. No. 4,127,798, for minimizing energy surges; U.S. Pat. No. 3,754,160 for a solid state inverter to reduce power consumption at ignition; and U.S. Pat. No. 4,288,724 for an impulse generator which replaces the ballast.

None of the aforementioned patents, while providing for the control of gaseous discharge lamps, addresses itself to the problem of maintaining a constant power input into a lamp which is in continuous discharge, and providing for automatic adjustment in power delivery when a lamp with different power requirement is substituted.

SUMMARY OF THE INVENTION

The present invention makes it possible to maintain effectively and efficiently the power level being delivered to a continually discharging, or glowing arc or gaseous discharge lamp.

In accordance with the principles of this invention a power supply with a ferrite core, low hysterisis loss transformer is employed operating at a constant frequency. In such an arrangement the amount of energy stored in the core at any given time is $\frac{1}{2}LI^2$. Thus where the energy to be supplied by the power supply to the lamp is dumped into the primary of such a transformer for subsequent delivery to the lamp, power can be maintained at a constant value regardless of changing load conditions by limiting the peak current reached in the primary to some fixed or predetermined value which gives the power desired.

In a preferred embodiment of this invention, there is provided a power supply for delivering DC electrical energy at a constant rate to a gaseous discharge lamp comprising a transformer and a source of DC current to the primary. A pair of electronic switches in the primary circuit are provided to permit opening and closing of the circuit so as to produce sawtooth waves through the primary. A driver is provided to close the switches at a fixed rate and control is exercised through the driver by varying the point when the switches are opened. Thus the beginning of each sawtooth wave occurs at regular intervals and the peak current is detemined by the point at which the switches are opened thereby ending build-up of the waves.

In order to insure that the same amount of energy is dumped into the transformer in each cycle, a current sense is provided to measure the peak current reached, a peak detector translates this into a voltage, and a pulse width modulator produces pulses whose width is a measure of this voltage. The driver receives this information and opens the switches at some point which maintains the peak current reached at some predetermined value.

The secondary of the transformer produces its pulse of electrical energy when the magnetic field of the transformer collapses, and a rectifying circuit is provided to smooth out the current flow for use by the gaseous discharge lamp. As the energy delivered through the transformer during each cycle is constant, it is seen that the IE delivered by the rectifier circuit must also be constant, so that if, for example, the impedance of the lamp drifts upwardly, current flow will decline, and voltage will rise, and vice versa. Another feature of this invention is provision to insure that when a lamp of different power rating is installed, there is an automatic adjustment in the supply.

It is thus a principal object of this invention to provide a constant power output power supply of improved efficiency and effectiveness.

It is another object of this invention to provide a constant power supply which is light in weight.

Other objects and advantages of this invention will hereinafter become obvious from the following description of a preferred embodiment of this invention.

BRIEF DESCRIPTION OF THE DRAWING

FIG. 1 is a schematic illustration of a preferred embodiment of this invention.

FIGS. 2a, 2b, and 2c are graphs of the idealized outputs of the current sense, peak detector, and pulse width modulator, respectively.

FIG. 3 is a less idealized graph of current flow in the transformer primary.

DESCRIPTION OF THE PREFERRED EMBODIMENT

Referring to FIG. 1, there is shown a constant power switching power supply 10 embodying the principles of this invention, for energizing arc lamp 11. Power supply 10 consists of a DC source 12 connected by way of plug 13 to a suitable AC outlet and containing a filter 14, and a bridge rectifier 15 and rectifying circuit 16 to deliver a high voltage to the primary of transformer T and a lower voltage to other circuits which will be described below. DC source 12 is of conventional design and its design does not form a part of this invention.

The high voltage output of DC source 12, typically 310 VDC, is delivered by way of conductor 17 to one end of the primary coil 18 of a transformer T which has a secondary 19 which, as will be described below, supplies its output to arc lamp 11. Transformer T is reverse wound and has a ferrite core with low hysteresis loss and is capable of being cycled at a very high rate, e.g., 50,000 cps. The transformer is light in weight and due to its low loss characteristics does not require any cooling.

The other end of primary coil 18 is grounded through conductor 22 and a parallel arrangement of a resistor R1 and a pair of resistors R2 and a programming resistor R3, the latter which is plugged in as will be hereinafter more particularly described. Resistor R1 is of low value, ie, about 1 ohm. Resistors R2 and R3 are of relatively high value with almost all current flow through resistor R1. Resistors R2 and R3 divide the voltage and the voltage measured at A is representative of current flowing through resistor R1. The latter is referred to herein as a current sense.

In conductors 17 and 22 are provided a pair of identical electronic switches S1 and S2 to open and close simultaneously the circuit in which they are located. These switches in this embodiment are field effect transistors which are capable of being opened and closed at a very high repetition rate.

Switches S1 and S2 are opened and closed in unison by a driver 24 which is a current amplifier that amplifies pulses supplied to it as will hereinafter be explained. Driver 24 delivers its pulses through conductors 26 and 28 to electronic switches S1 and S2, respectively.

Current flow in resistor R1 as represented at A, in the form of sawtooth waves, shown in FIG. 2a, is supplied to an amplifier 32 and thence to a peak detector 34, the latter of which produces a steady state voltage illustrated in FIG. 2b, whose amplitude is a direct function of the peak current Ip reached, as represented by the sawtooth wave shown in FIG. 2a. This voltage is the input to a pulse width modulator 36 which is an oscillator producing a series of pulses, illustrated in FIG. 2c, the width of each pulse being a function of the voltage input. Driver 24 amplifies these pulses and switches S1 and S2 are held closed during the time interval covered by the pulses. Between pulses, switches S1 and S2 are open. As will be seen from the discussion further below, the sawtooth waves shown in FIG. 2a are idealized there, and may in fact take a variety of shapes, and in some cases might look like the waves illustrated in FIG. 3 for reasons which will be later noted.

A pair of diodes D1 and D2 connected between conductor 17 and ground, and conductors 22 and 17, respectively, are provided to provide a harmless return of energy to the power supply when there is no load or lamp present.

While the operation of the circuit just described will be explained below, it should be noted at this point that the pulse frequency is held constant so that the beginning of each sawtooth wave and pulse, at time Ti, is at a fixed repetition rate, but the termination of these waves, at time Tc, is regulated to accomplish the results of this invention.

The secondary circuit of transformer T consists of the secondary 19, a diode D3, a capacitor C in parallel as shown, an ignition circuit or ignitor 42, and arc lamp 11. The latter is plugged in as shown schematically by a single probe connector 44 and a plug 46 shown in phantom. Diode D3 and capacitor C provide for rectification of transformer output, while ignition circuit 42 is part of the lamp starter. When lamp 11 becomes ignited, the impedance of circuit 42 drops to or near zero where it remains for as long as the lamp is glowing. Ignition circuit 42 is of conventional design and does not form a part of this invention.

The amplitude of the sawtooth wave delivered to amplifer 32 will depend on the resistive value of programming resistor R3 so that when arc lamp 11 is replaced, and the new lamp has a different power requirement, then resistor R3 would have a different value so as to obtain the desired peak curent Ip. An important aspect of this invention is that arc lamp 11 along with its appropriate programming resistor R3 may be mounted together in and with removable plug 46, using prongs and jacks 47. Plug 46 contains within its body, an interlock wire 48 and programming resistor R3, and two leads 52 and 54 to lamp 11 and ground, respectively, coming out of plug 46. The other side of lamp 11 is connected through a high voltage lead 56 to single probe connector 44. The voltage in lead 56 is during ignition quite high, of the order of 25,000 volts. Plug 46 in this arrangement is a female connector with prongs coming out of power supply 10 connected to leads 58 and 62 to act as an interlock for the power supply, a conductor 64 to one side of secondary 19, a ground conductor 66, and conductors 68 and 72 for programming resistor R3.

Lamp 11 and its programming resistor are always replaced together thereby insuring that the lamp will always be receiving its proper power input.

In the operation of power supply 10, source 12 provides a high voltage DC current to primary 18 and resistor R1. Electronic switches S1 and S2 are opened and closed in unison by driver 24.

When switches S1 and S2 are closed, at Ti shown in FIGS. 2a–2c, current ideally builds up at a linear rate with time, and when the switches are opened at Tc, current flow ceases almost instantaneously.

Current flow in conductor 22 as represented at junction A is thus a series of sawtooth waves as shown in FIG. 2a. This signal is amplified in amplifier 32 and delivered to peak detector 34 which produces a steady voltage output, as shown in FIG. 2b, whose amplitude is a measure of the peak of the sawtooth waves shown in FIG. 2a, designated as Ip, as already noted. Hence, the later each wave is cut off, the higher Ip will be and the larger the amplitude of the voltage output will be from the peak detector 34.

The output of detector 34 is supplied to pulse width modulator 36. The latter is an oscillator of constant frequency which produces square waves as illustrated in FIG. 2c. As noted, the beginning of each wave, designated Ti in the graphs occurs at the same point in each cycle, and the point at which the sawtooth waves in FIG. 2a and the pulses in FIG. 2c terminate, shown as Tc, varies. Driver 24 receives the square wave output of modulator 36, amplifies the pulses, and actuates switches S1 and S2 so that they close at Ti and open at Tc.

As noted earlier, the amount of energy stored in primary coil 18 during the time that switches S1 and S2 are closed is a direct function of the peak current, Ip, which is reached. In order to insure that a constant level of energy is stored in transformer T during each cycle, it is necessary to cut off the sawtooth waves so that Ip is always the same.

There is a tendency for the slope and shape of the sawtooth waves to fluctuate in accordance with load and line voltage changes, such as, for example, when changes in the impedance of arc lamp 11 occur.

To maintain power flow constant to lamp 11, modulator 36 adjusts pulse width delivered to driver 24 by changing Tc to maintain a constant voltage input, and hence, an unvarying peak current Ip.

It has been noted that FIG. 2a shows an ideal representation of the sawtooth waves which are represented at junction A. In fact, these waves vary in shape and linearity, and in addition, if the field in transformer T is not completely collapsed between time Tc and Ti, the initial starting point for the next sawtooth wave will be at some point above the zero base line. In that case, the power discharged into the secondary will be based upon the difference in current flow from Ti to Tc in the relationship $\frac{1}{2}LI^2$ previously described, as illustrated in FIG. 3. However, it has been found in the practice of this invention that regardless of the shape and linearity of the sawtooth waves and the variations which occur, the circuit herein described maintains a constant Ip irrespective of line voltage and load variations, and that such control results in a closely regulated preselected power delivery to the lamp which is in service.

When switches S1 and S2 are closed and primary current is building up, diode D3 blocks current flow in the secondary. When these switches are opened at Tc, the collapsing magnetic field discharges the energy into secondary 19 and the output circuit. Diode D3 and capacitor C smooth out the pulses and a DC current is supplied to arc lamp 11. Power flow is constant. This is reflected in what happens as the impedance of lamp 11 changes. For example, when it rises, current flow decreases, but the voltage rises sufficiently to maintain a constant IE, and vice versa.

Arc lamp 11 and its appropriate programming resistor R3 are connected through plug 46 so that when lamps are changed, plug 46 is also changed and there is an automatic adjustment of the power level being delivered if such a change is required. This assures that at all times there will be proper power selection and avoids the problem of making a manual readjustment of power levels when a different kind of lamp is inserted.

As an example of this invention, power supply 10 was employed in conjunction with a xenon lamp which was rated by the manufacturer for 150 watts. Conductor 17 delivered 310 VDC, a programming resistor of 3.3K ohms was employed, and resistors R1 and R2 were about 1 ohm and 10,000 ohms, respectively. The peak current Ip as represented at A was 4 amperes, and 16 volts were delivered during normal operation of lamp 11 when it was new. As the lamp aged and some of the electrodes burned away, current flow declined but the circuit compensated by increasing the voltage being delivered to maintain a constant delivered power.

The invention as described hereinabove when incorporated into a power supply for the operation of an arc lamp, is extremely efficient in that losses due to heat are so small that no cooling fans or other powered means is required. It is also extremely light in weight, a specific embodiment weighing typically only seven pounds as compared to existing devices which require heavy transformers. In addition, it is able to control power flow easily to within variations of plus or minus 3%.

While only a preferred embodiment of this invention has been described, it is understood that many variations thereof are possible without departing from the principles of this invention.

What is claimed is:

1. Apparatus for delivering DC electrical power at a constant rate to continuously operating load means comprising:
   a. means for generating a series of spaced, generally sawtooth shaped waves;
   b. means for initiating said waves at a predetermined unvarying frequency;
   c. means in response to the peak current reached by said waves to terminate said pulses at times so as to maintain a preselected peak current; and
   d. means for delivering the electrical energy in said sawtooth waves to said load means during the periods of time between said sawtooth waves, said power being delivered to said load means being thereby maintained at a constant, predetermined level irrespective of variations in line voltage and impedance of said load means.

2. The apparatus of claim 1 in which said delivering means includes a ferrite core transformer with low hysteresis losses, the primary side of said transformer having current sensing means for measuring the peak current reacted by said sawtooth waves, the secondary side of said transformer delivering said power to said load means.

3. The apparatus of claim 2 having means linked to said load means for programming said apparatus to deliver a preselected level of power to said load means whereby a change in said load means requiring a different level of power delivery will automatically reprogram said apparatus for the different level of power delivery.

4. The apparatus of claim 3 in which said programming means comprises means plugged in by said load means into the primary side of said transformer to select the peak current reached by said sawtooth waves and maintained by said apparatus.

5. A circuit for delivering DC electrical power at a constant rate to continuously operating load means comprising:
   a. a source of DC;
   b. transformer means whose primary receives said DC;
   c. electronic switching means for interrupting said DC to produce generally sawtooth shaped spared waves passing through said primary;
   d. current sensing means for measuring current growth of said sawtooth waves in said primary;

e. means for producing at a constant frequency pulses whose width is a function of peak current reached by said sawtooth waves, each of said pulses being initiated at an unvarying repetition rate;
f. driver means for closing said electronic switch means at the initiation of each said pulses at a constant frequency and opening said electronic switch means in response to said pulse width so as effectively to maintain a constant current peak current reached by said sawtooth waves;
g. said transformer means having a secondary in which current flows when the magnetic field in said transformer means collapses as a result of the opening of said electronic switch means; and
h. means for delivering the output of said secondary to said load means, said power thereby being held at a constant, predetermined level irrespective of changes in line voltage and impedance of said load means.

6. The circuit of claim 5 in which said load means includes means for automatically selecting the output of said circuit so that when said load means is connected to said secondary said circuit will automatically effect adjustment of power output.

7. The circuit of claim 6 in which said load means comprises a continuously glowing gaseous discharge lamp and said selecting means is linked to said lamp.

8. The circuit of claim 7 in which the selecting means linked to said lamp programs the peak current reached in said primary for establishing in said circuit the predetermined level of power required by said lamp to be delivered by said circuit.

9. The circuit of claim 8 in which said lamp and said selective means are linked in jacking means whereby replacement of said lamp with another lamp also replaces said selecting means.

10. The circuit of claim 9 in which said jacking means also includes a power interlock which disconnects said current from its source of power when said lamp is disconnected by said jacking means.

* * * * *